United States Patent [19]
Tanner

[11] 3,873,966
[45] Mar. 25, 1975

[54] AUDIBLE ALARM FOR MOTOR VEHICLE

[76] Inventor: Michael D. Tanner, 1702 N. Trevor, Mesa, Ariz. 85203

[22] Filed: Jan. 30, 1974

[21] Appl. No.: 437,832

[52] U.S. Cl.............. 340/63, 340/274, 200/42 R, 200/61.44
[51] Int. Cl............................................ B60r 25/10
[58] Field of Search......... 340/63, 64, 65, 215, 273, 340/274, 99, 281; 307/10 AT; 200/42 R, 61.44, 61.52, 61.62, 61.7, 61.81, 61.84, 61.93, 182, 193, 220, 234

[56] References Cited
UNITED STATES PATENTS
2,431,838   12/1947   Staley ............................ 340/281 X
3,087,145   4/1963    Fruh ................................. 340/274
3,488,651   1/1970    Brenner .......................... 340/274 X

*Primary Examiner*—Alvin H. Waring
*Attorney, Agent, or Firm*—William H. Drummond; Don J. Flickinger

[57] ABSTRACT

A signalling device for emitting an audible warning in response to the unauthorized attempt to gain access to the fuel tank filler neck of a motor vehicle has a normally open gravity-actuated switch which closes the horn circuit when the door covering the filler neck is opened. A selective on-off switch controlled by the vehicle operator permits normal operation of the cover.

1 Claim, 3 Drawing Figures

PATENTED MAR 25 1975 3,873,966
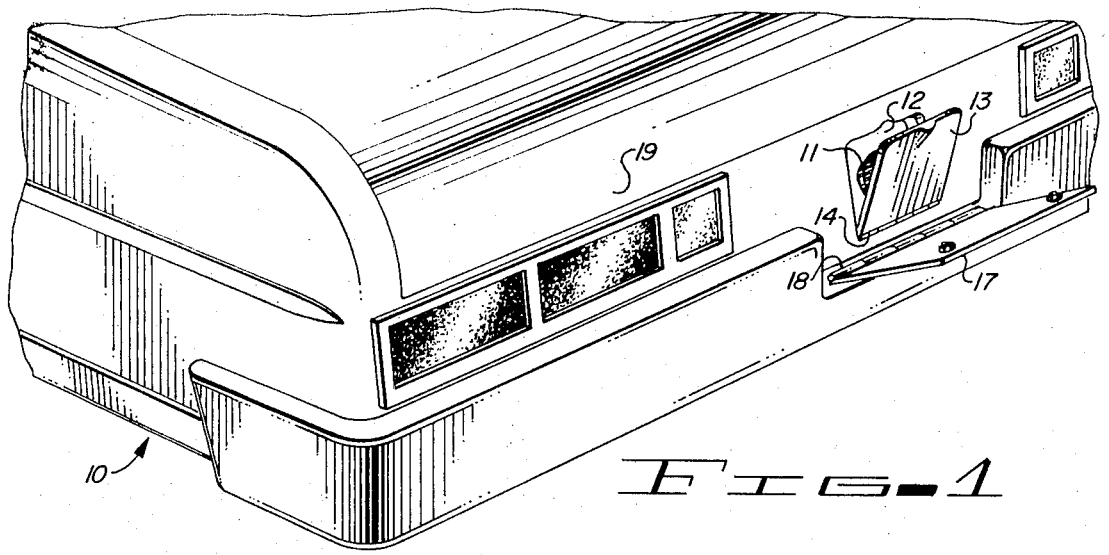
FIG-1
FIG-2
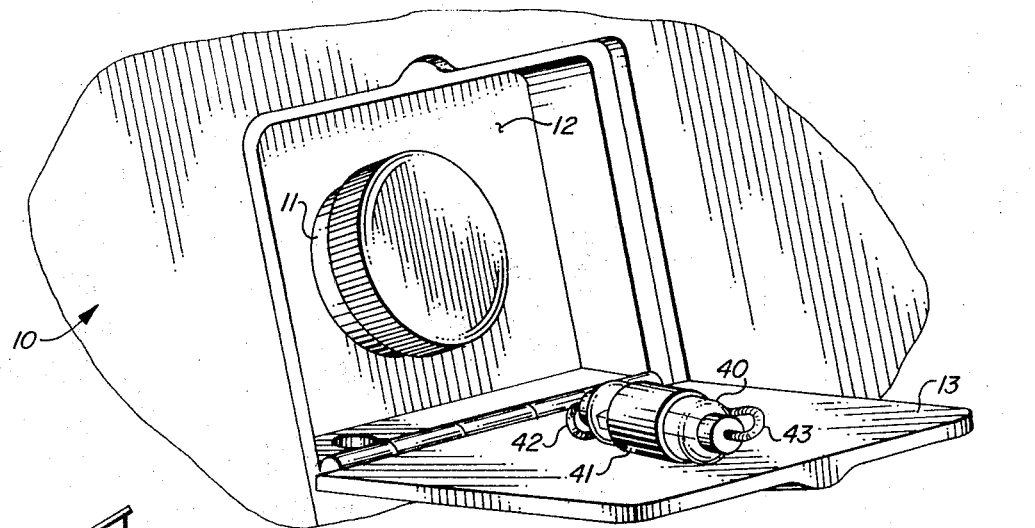
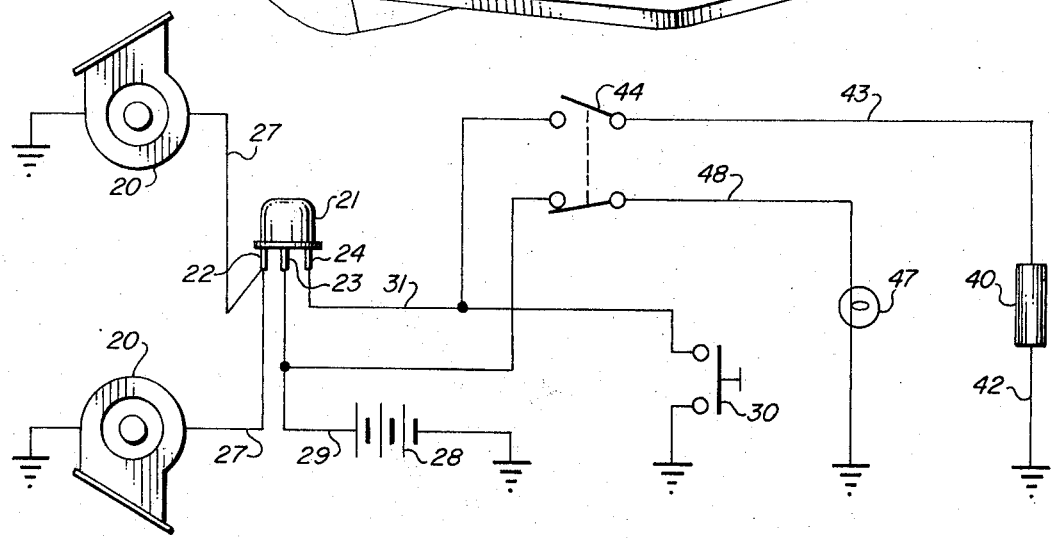
FIG-3

AUDIBLE ALARM FOR MOTOR VEHICLE

This invention relates to motor vehicle accessories.

In a further aspect, the invention concerns accessories of the type which provide a warning to reveal an attempted theft in connection with the motor vehicle.

More specifically, the invention concerns an accessory device to emit an audible warning when an unauthorized person attempts to gain access to the fuel tank filler neck.

The unauthorized taking or theft of fuel from an unattended motor vehicle is a common occurrence. Always present are thieves who continuously seek opportunities to procure another's property at no cost for their own benefit. Many other persons who normally are not so inclined are pressed into stealing gasoline during periods of national concern, such as inflation, business recession, or various crises which are manifested by high prices, lack of money and scarcity of commodity.

The most common technique for stealing fuel from a motor vehicle involves inserting a hose through the filler neck of the fuel tank and then siphoning the fuel into a portable container. Generally, the process involves the well-known mouth and gravity method which is even legally employed by the vehicle owner to obtain small amounts of gasoline for use as a cleaning solvent or in the power lawnmower. For the serious taker of gasoline, or thief, there are commercially available portable hand-operated pumps which greatly increase the efficiency and rapidity of the operation. During times of national concern, such pump devices are highly publicized through commercial advertising and store displays.

The prior art has proposed several devices to prevent the theft of fuel from unattended vehicles. The most commonly accepted prior art device is the locking fuel tank cap. Other solutions include a locking cover over the filler neck inside the vehicle, especially the trunk, and then providing the trunk either with a lock having an exterior key receptacle or a catch arrangement that is operable only from within the cockpit of the vehicle. Such solutions, however, are only momentary deterrents to the person intent on gaining access to the fuel tank filler neck. The skillful thief can quickly open the lock, while the less skillful with equal speed can either break or pry open the locked cover or cap.

It is becoming standard practice for automobile manufacturers to disguise the inlet of the filler neck under a hinged cover panel on the exterior of the automobile. The initial step in gaining access to the filler neck, therefore, is opening the cover. Such covers are generally for styling purposes and are not lockable, but the vehicle owner may employ a locking fuel tank cap under the cover. However, since such devices have proven to be ineffectual deterrents to the thief intent upon stealing fuel from an unattended vehicle, a more appropriate solution would broadcast the presence of the thief during the initial attempt of his activity.

Accordingly, it is a principal object of the present invention to provide a motor vehicle accessory which will warn of the occurrence of an attempted theft of fuel.

Another object of the present invention is to provide an audible signal when the fuel tank filler neck cover is moved from the closed position by an unauthorized person.

Still another object of the present invention is the provision of a signalling device which is under the control of the vehicle operator to selectively permit authorized access to the filler neck from the operator's normal station.

Yet another object of the invention is to provide an accessory of the above type which can be readily installed by the vehicle owner without special tools or skills.

Yet still another object of the invention is to provide an accessory of the signalling type which utilizes a portion of the vehicle electrical system, including the horn.

A further object of the invention is the provision of a vehicle accessory of the above type which is inexpensive to manufacture, requires negligible maintenance and is reliable in operation.

Briefly, to achieve the desired objects of the present invention, first provided is a gravity-actuated switch installed on the interior side of the fuel tank filler access door. The switch is oriented to be normally opened when the door is closed and to close as the door is opened. An electric lead communicates between the gravity-actuated switch and the horn relay. The gravity-actuated switch, therefore, functions as the vehicle horn button to complete the horn circuit and energize the horn when the access door is displaced from the normally closed position. A selective open-closed switch in series between the gravity-actuated switch and the relay is positioned for control by the vehicle operator. By convenient manipulation of the selective switch, the vehicle operator can readily permit access to the fuel tank filler neck by authorized persons such as service station attendants.

The foregoing and further and more specific objects and advantages of the present invention will become readily apparent to those skilled in the art from the following detailed description of the preferred embodiment thereof taken in conjunction with the drawings, in which:

FIG. 1 is a partial perspective view of a generalized illustration of a conventional automobile;

FIG. 2 is an enlarged fragmentary perspective view of the fuel tank filler access area of a conventional automobile, to which has been secured the accessory device of the present invention; and FIG. 3 is a schematic representation of a conventional motor vehicle horn circuit having the audible signalling device of the present invention interconnected therewith.

Turning now to the drawings, in which the same reference numerals indicate corresponding elements throughout the several views, attention is first directed to FIG. 1 which shows a motor vehicle, herein represented as a conventional automobile generally designated by the reference character 10, having the fuel tank filler neck inlet end 11 located center rear of the vehicle. The end of the filler neck 11 resides in a recess 12 normally covered by a door 13 fixed along the bottom edge thereof to the vehicle by a hinge 14. A license plate-bearing panel 17 secured to the automobile 10 by a hinge 18, when in the normally "up" position, disguises the fuel tank filler access area.

Certain automobile manufacturers do not include the cover door 13 and depend upon the panel 17 to serve the function thereof. Other manufacturers locate the filler neck inlet end 11 in an adjacent area under the rear deck 19 such that the filler neck does not extend to the exterior of the vehicle. Still other manufacturers employ a recess 12, a cover door 13 and a hinge 14 generally as shown, except arranged on the side of the vehicle generally in a fender area. While the cover door 13 is specifically herein illustrated as being hingedly secured along the bottom thereof, it is well known in the art that the hinge 14 may be variously positioned with respect to the cover door 13, especially in the instance of fender-mounted access areas. In any event, the door 13 resides in a generally vertical position when closed and must be displaced therefrom to gain access to the filler neck.

FIGS. 2 and 3 illustrate the installation and operation of the device of the present invention. First described is the existing horn circuit of a conventional motor vehicle. A pair of electric horns 20 are arranged near the front of the vehicle and so mounted as to provide a loud audible signal exterior of the vehicle. The horn relay 21 has three connections — a horn terminal 22, a field terminal 23 and a switch terminal 24. The horn terminal 22 communicates with the horns 20 through electric leads 27. The field terminal 23 communicates with the automotive storage battery 28 through electric lead 29. The horn button 30, a momentary contact switch generally located in connection with the stearing wheel, communicates through electric lead 31 with the switch terminal 24. It is noted that the horns 20, the battery 28 and the momentary contact switch 30 are grounded to a common source, generally the vehicle frame. Pushing upon the horn button and closing the switch 30 activates the solenoid within the relay 21 to close the contact between the horn terminal 22 and the field terminal 23. The electrical circuit between the horns 20 and the battery 28 is now completed to energize the horns to emit an audible signal.

The device of the present invention first includes a normally open gravity-actuated switch 40, such as the liquid mercury switch sold under the trade name of "Whirlpool" and bearing identification number 83979, which is secured to the cover door 13 by the manufacturer's bracket 41. The attachment is quickly and conveniently made with sheet metal screws, nuts and bolts or pop rivets. One electric lead, shown as wire 42, is committed to the common ground while the other lead, shown as wire 43, is connected to the horn button wire 31 under the vehicle dashboard in the vicinity of the stearing wheel column. It is apparent that when the gravity-actuated switch 40 is disturbed from the normally open position, as when tilted by opening the cover door 13, the horn circuit is completed to energize the horns as hereinbefore described.

A selective open-closed switch 44 in series in the lead 43 and located in the cockpit of the vehicle provides the operator the control to permit authorized persons, such as service station attendants, to gain access to the gas tank filler neck without activating the audible signal device. An indicator light 47 positioned for operator viewing and connected to the field lead 29 by lead 48 extending through the double-pole switch 44 functions as a reminder to the operator to close the switch 44 after the vehicle has been serviced.

The ineffectiveness of prior art devices has been hereinbefore described in detail. One of the reasons that such devices are readily overcome is the visibility of the device, which permits the perspective thief to take appropriate action. On the contrary, the device of the present invention is undetectable until the cover door has been partially opened. At this time, however, the warning has been sounded, the prospective thief has been startled and considerable attention is directed to the activity. As is apparent, the audible warning will be emitted for the duration that the cover door is displaced from the normally closed position. Encasing any exposed leads, especially the wires 42 and 43, in a metallic sheath will prevent unauthorized persons from disabling the device.

Various changes and modifications in the device herein chosen for purposes of illustration in the drawings will readily occur to those skilled in the art. An apparent modification is the elimination of the warning indicator light 47 which does not contribute to the intended primary purpose of the device. Another modification includes placing the switch 44 in a hidden position, whereby it is not necessary for the vehicle operator to lock the doors when leaving the vehicle unattended. Other minor modifications, such as to the exact terminal to which the lead 43 is connected, is dependent upon the specific vehicle to which the device is installed.

Having fully described and disclosed the present invention and the preferred embodiment thereof in such clear and concise terms as to enable those skilled in the art to understand and practice the same.

The invention claimed is:

1. For use in combination with the horn circuit of a motor vehicle, which horn circuit includes
   an electric horn,
   an electrical energy source,
   a normally open momentary contact switch, and
   a relay interconnected between said horn, said electrical energy source and said momentary contact switch for completing the electrical circuit between said horn and said electrical energy source in response to closure of said momentary contact switch,
and which vehicle further includes
   a liquid fuel storage tank,
   a fuel tank filler neck extending from said fuel tank and having an inlet aperture at the free end thereof, and
   a door hingedly secured to said vehicle and having a first position for normally covering the free end of said filler neck and a second position angularly displaced from said first position for exposing said filler neck,
improvements therein to provide an audible signal in response to an attempt to gain access to said filler neck when said access is not authorized by the operator of said vehicle, said improvements comprising:
   a. a normally open gravity-actuated switch;
   b. mounting means for rigidly securing said gravity switch to said door,
   said gravity switch being normally open when said door is in said first position and closing as said door is displaced toward said second position;
   c. an electrical lead communicating between said gravity switch and said relay; and
   d. a selective open-closed switch positioned for control by the operator of said vehicle and in series with said electrical lead,
   whereby said horn is energized as said door is moved toward said second position and said selective switch is closed.

* * * * *